United States Patent [19]

Akiyama

[11] Patent Number: 4,688,103
[45] Date of Patent: Aug. 18, 1987

[54] APPARATUS FOR THE COLOR SYNCHRONIZATION OF REPRODUCED VIDEO SIGNALS

[75] Inventor: Toru Akiyama, Saitama, Japan

[73] Assignee: Pioneer Electronic Corporation, Tokyo, Japan

[21] Appl. No.: 714,325

[22] Filed: Mar. 21, 1985

[30] Foreign Application Priority Data

Mar. 21, 1984 [JP] Japan .................................. 59-54051
Mar. 30, 1984 [JP] Japan .................................. 59-62601

[51] Int. Cl.[4] .............................................. H04N 9/87
[52] U.S. Cl. .................................... 358/326; 358/325
[58] Field of Search ............... 358/320, 323, 324, 325, 358/326, 319

[56] References Cited

U.S. PATENT DOCUMENTS

4,403,244 9/1983 Fujishima ........................... 358/325
4,460,926 7/1984 Nakamuta ........................... 358/325
4,468,709 8/1984 Kenjyo ................................ 358/326

Primary Examiner—Donald McElheny, Jr.
Attorney, Agent, or Firm—Sughrue, Mion, Zinn, Macpeak, and Seas

[57] ABSTRACT

An apparatus for the color synchronization of reproduced video signals, including a phase-locked loop (PLL) circuit. The PLL circuit detects a phase difference between a reproduced video signal (which may be a PAL video signal), and the output of a voltage-controlled oscillator within the PLL circuit, and has an internal loop filter which operates such that, when the apparatus is in an external synchronization mode, a high frequency component of the detected phase difference is used to control the time-base error of a variable delay line in the apparatus. Control means are included for placing the apparatus in external or internal synchronization mode, depending on the presence or absence of an external control signal. Further means are included for substantially precisely holding the phase inversion condition of a PAL video signal.

7 Claims, 19 Drawing Figures

APPARATUS FOR THE COLOR SYNCHRONIZATION OF REPRODUCED VIDEO SIGNALS

BACKGROUND OF THE INVENTION

The present invention relates to an apparatus for the color synchronization of reproduced video signals, and more particularly, to an apparatus for effecting the external synchronization of color video signals reproduced from video disk players.

Figure 1:
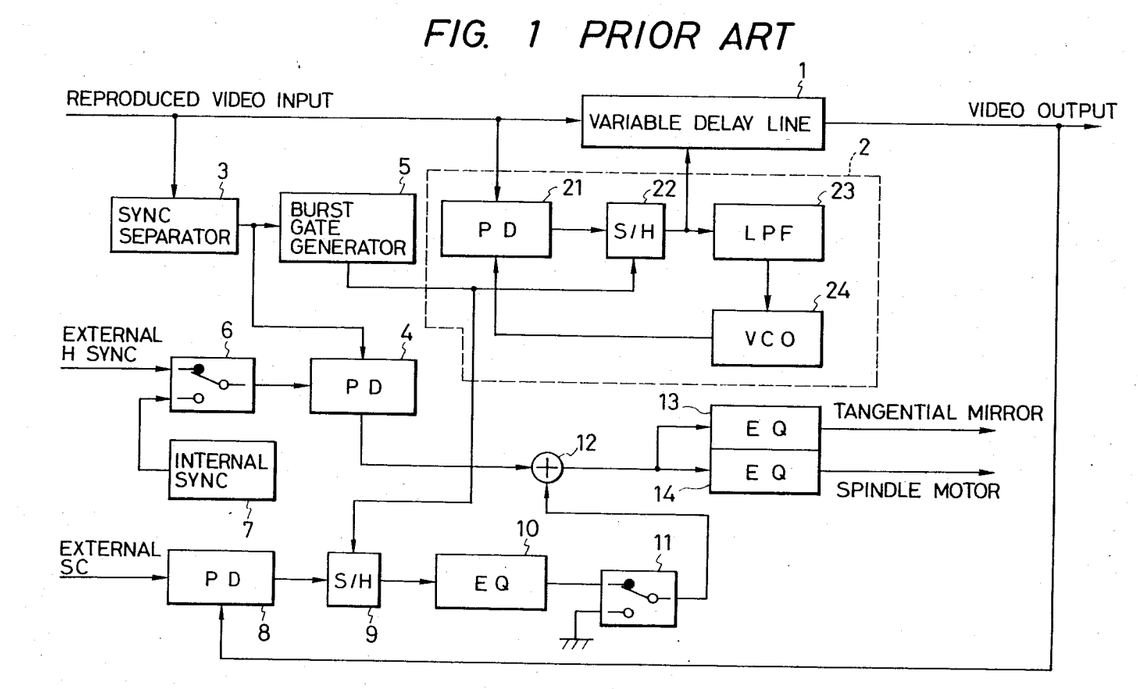
FIG. 1 is a block diagram for a conventional color synchronizing apparatus.

FIG. 1 shows a conventional color synchronizing system, wherein a reproduced video input signal passes to a variable delay line 1 and thence to an external circuit as a time-base controlled video output. The reproduced video signal is also applied to one of the two inputs of a PD (phase detector) 21, whose other input is supplied with an output from a VCO (voltage-controlled oscillator) 24. The output of PD 21 is sampled in a S/H (sample and hold) circuit 22 for each horizontal scanning period (1H), and the hold output of the S/H circuit 22 controls the variable delay line 1 while it is used as a signal for controlling VCO 24 through a LPF (low-pass filter) 23.

The reproduced video input signal is also fed into a sync separator 3 and, after a horizontal sync signal is separated therefrom, it is supplied to one input of a PD 4. The separated horizontal sync signal is fed into a burst gate generator 5, which generates sampling signals to control the sampling at the S/H circuit 22 as long as the color burst is on. The other input of PD 4 is supplied with a selective output from a switch 6 that selects either external or internal synchronization. In an external synchronization mode (when the contact indicated by the solid circle in switch 6 is made), an external sync signal is selected, and in an internal synchronization mode, an internal sync signal from an internal sync generator 7 is selected.

The circuit shown in FIG. 1 also includes PD 8 which receives at its two inputs the output of the variable delay line 1 and an external subcarrier. The output of PD 8 is fed through a S/H circuit 9 and an equalizer 10 to be received at an external synchronization input (or the contact indicated by the solid circle) in switch 11 that selects either external or internal synchronization. The operation of the S/H circuit 9 is controlled by sampling signals generated at the burst gate generator 5. The internal synchronization input of the switch 11 is grounded.

The output of the switch 11 and the PD 4 are summed in an adder 12, and the summed signal is fed through equalizers 13 and 14 which provide servo signals for a tangential mirror (not shown) and a spindle motor (not shown).

The reproduced signal entering the circuit shown above contains jitters, and in order to absorb them, a 3.59 MHz continuous wave which is synchronous with the color burst for the reproduced video signal is generated in the PLL circuit 2 so that the amount of delay in the variable delay line 1 is controlled by using the phase error caused in the PLL circuit 2 as a time base error signal. This enables the proportional control of the reproduced video signal, and the input/output characteristics of the phase in the variable delay line 1 are represented by:

$$G'(s)/(1+G'(s)) \qquad (1)$$

wherein $G'(s)$ is the open loop gain of the PLL loop 2.

Figure 2:
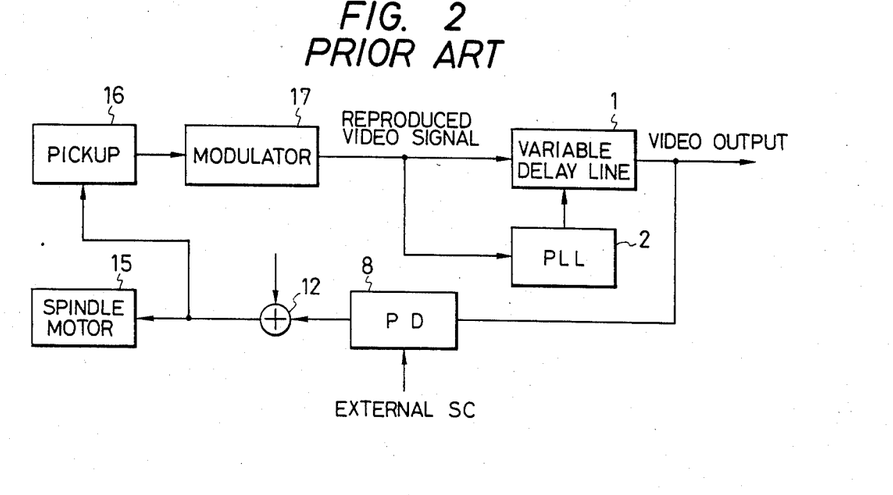
FIG. 2 is a schematic functional block diagram for the system in FIG. 1 when it is in an external synchronizing mode.

FIG. 2 shows the schematic functional block diagram of FIG. 1 in an external synchronizaiton mode, and includes a spindle motor 15, a pickup 16 and a modulation circuit 17. The PD 8, adder 12, spindle motor 15, pickup 16, modulator 17 and variable delay line 1 form a color loop that achieves color phase matching between the reproduced signal and the external subcarrier. If the closed-loop transfer function of this color loop excluding the variable delay line 1 is written as $G(s)$, the open-loop characteristic of the whole system is calculated as follows from formula (1):

$$G(s) \cdot G'(s)/(1+G'(s)) \qquad (2)$$

This indicates the inclusion of a small proportional-control loop within a large color loop.

Since the proportional-control loop included in the color loop for absorbing jitters has a PLL circuit, the system shown in FIGS. 1 and 2 includes a circuit having the transfer function $G'(s)/(1+G'(s))$ which represents the closed-loop characteristics of the PLL. The PLL is usually driven in a relatively low loop frequency band ($f_c = 10$ Hz) so that it will not be responsive to higher frequencies. This low loop frequency band is necessary for extracting a time-base error value from the low-frequency component.

In internal synchronization mode, any jitter and color fluctuation can be eliminated in both low and high frequency ranges. However, in external synchronizaion mode, the color loop has the closed-loop transfer function represented by formula (2) and since it acts as if it contained a low-pass filter, it is unable to achieve a very large loop gain. Because of this insufficiency of loop gain, the system shown in FIGS. 1 and 2 exhibits a stationary phase error too great to ensure phase matching between the external subcarrier and the output video signal.

Instead of supplying the output of the variable delay line 1 to one input of PD 8 in FIG. 1 or 2, a portion of the input to the variable delay line 1 may be fed to that input of PD 8; this eliminates the proportional-control circuit loop from the color loop, thereby increasing the gain of the color loop. However, the greatest problem with this method is that if the amount of absolute delay in the variable delay line changes by temperatures and other factors, the color phase of the output video signal may become offset from the external subcarrier (the variable delay line usually employs a variable-capacitance diode and is subject to considerable variations in the amount of absolute delay due to temperature changes).

Another problem arises with respect to external synchronization when the reproduced video input signal undergoing external synchronizaton is a PAL color video signal.

The PAL system color video-signal $E_P$ is expressed by the following equation:

$$E_p = Y + (B-Y) \sin \omega_s t \pm (R-Y) \cos \omega_s t \qquad (3)$$

where
  Y denotes a luminance signal,
  B and R denote blue and red signals, and
  $\omega hd s$ denotes the angular frequency of a color subcarrier wave which is about 4.43 MHz.

Figure 3:
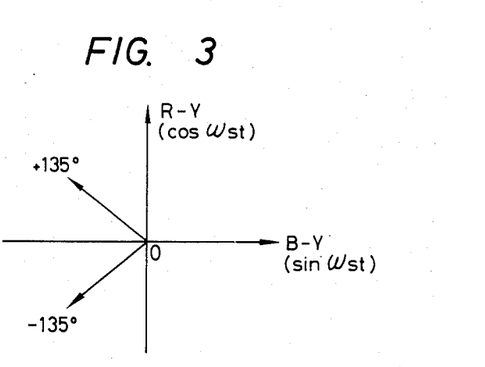
FIG. 3 is a graph illustrating PAL phase condition.

In Eq. (3), the signal indicates phase-inversion per horizontal scanning line. The (R−Y) component of a color carrier signal issues a subcarrier signal ±cos ω$_s$t having a phase difference of 180 deg. between scanning lines after AM-modulation. Therefore, on a TV receiver side, a burst signal has to have additional information for phase inversion, at each line, of the subcarrier for remodulation of the (R−Y) component. Accordingly, as understood from the vector diagram shown in FIG. 3, a color burst signal is changed over at each line so as to have a phase of ±135 deg. about the (B−Y) axis and is issued as a phase-inversion signal sin (ω$_s$t±135 deg.).

The following steps must be carried out in the case of the external synchronization of such a PAL system color video signal for image-synthesization:

(1) Synchronizing both H (horizontal) and V (vertical) synchronizing signals with H and V external synchronizing signals;

(2) Synchronizing color burst signals with an external reference subcarrier; and (3) Precisely holding the inverse condition of PAL phase (which means the phase of both the color burst signals and the (R−Y) cos ω$_s$t signal.)

In particular, with respect to the PAL phase in (3) above, color tones sometimes may be precisely reversed with respect to the (B−Y) axis upon image synthesization or the like. In a VDP (video-disc player) for example, when scanning and track jumping are performed in special reproduction, the condition of PAL phase inversion changes at a certain point in time (e.g. during track jumping.)

SUMMARY OF THE INVENTION

Accordingly, one object of the present invention is to provide an apparatus for the color synchronization of reproduced video signals, and said apparatus being capable of operating in an external synchronizing mode with a stable increased color loop gain.

It is another object of the invention to provide an apparatus for the color synchronization of reproduced PAL video signals, said apparatus being capable of operating in an external synchronizing mode with a stable increased color loop gain.

Still another object of the present invention is to provide an apparatus for the color synchronization of reproduced PAL video signals, said apparatus being capable of holding precisely the phase inversion condition of a PAL video signal.

In order to accomplish the first and second objects, the apparatus of the present invention comprises a first control means that detects the difference in phase between the output of an oscillation means and a reproduced color video signal and controls the time base of said reproduced color video signal in accordance with the detected phase difference, a second control means that detects the difference in phase between the color subcarrier of the controlled reproduced color video signal and an external subcarrier and controls the time base of the reproduced color video signal in accordance with the detected phase difference, and a means for performing ON/OFF control on said second control means in accordance with an external control signal, characterized in that the phase difference detected by said first control means contains a higher frequency component when said second control means is on than when it is off.

To accomplish the third object, there is provided, as one element of the present invention, a PAL system color video signal processing device which is characterized by PAL phase inversion means for converting the phase of the chrominance component of a PAL system color video signal into one which is symmetircal with respect to the (B−Y) axis; selection means for selectively outputting the output of the PAL phase inversion means and the chrominance component of the above-mentioned signal; phase detecting means for detecting the color burst phase of the selected output; and control means for comparing a signal indicating the normal condition of PAL phase inversion of the above-mentioned chrominance component at each horizontal scanning line and the detection signal from the phase detection means so as to change over the selecting condition of the selection means when the indicating signal and the detection signal are different.

BRIEF DESCRIPTION OF THE DRAWINGS

A detailed description of the invention follows below with reference to the accompanying drawings, in which.

DETAILED DESCRIPTION OF THE PREFERRED EMBODIMENTS

Figure 4:
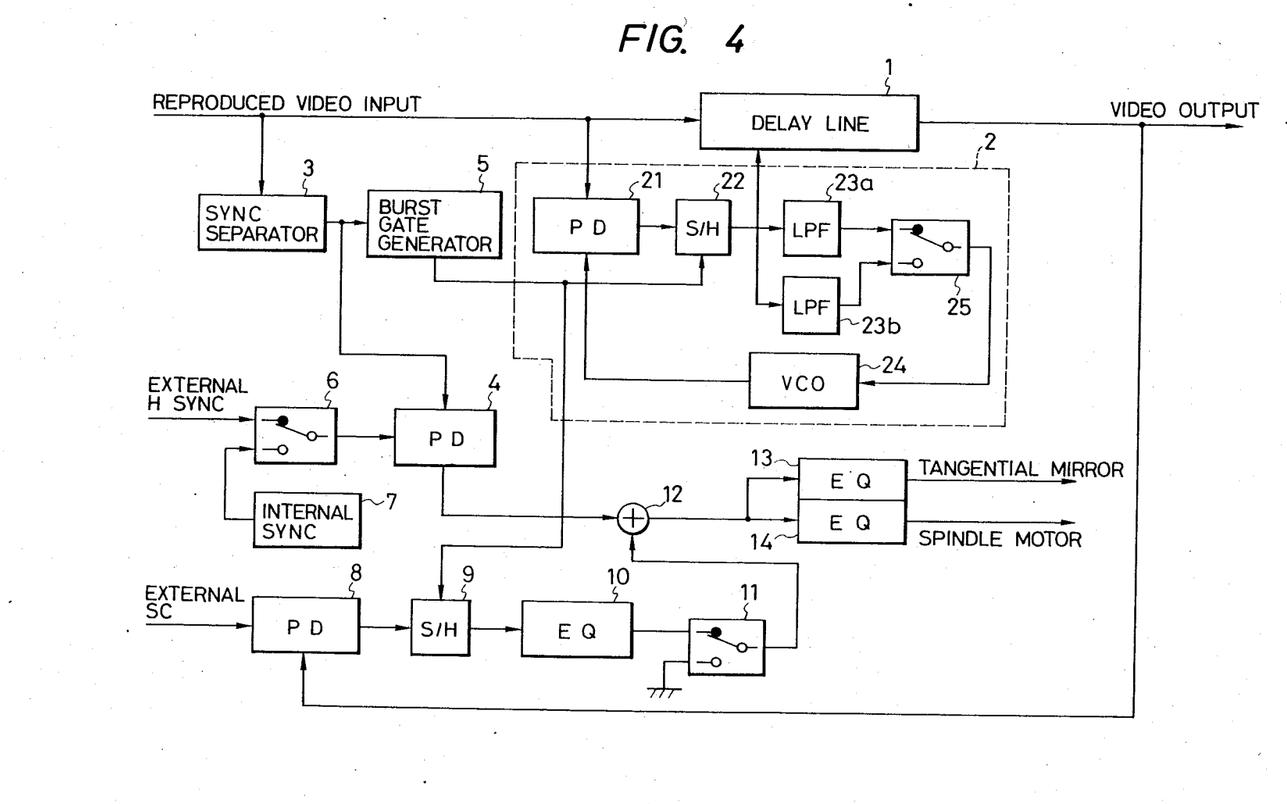
FIG. 4 is a block diagram for the synchronizing apparatus in accordance with one embodiment of the present invention.
Figure 5:
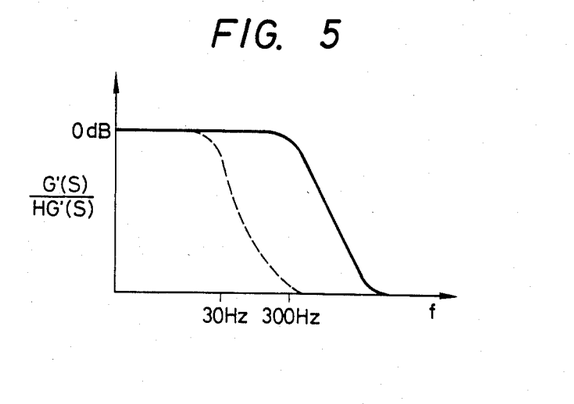
FIG. 5 is a graph showing the characteristics of the apparatus in FIG. 4.

Two preferred embodiments of the present invention are hereunder described by reference to FIGS. 4 to 6. FIG. 4 is a block diagram for one preferred embodiment of the invention. The components common to FIG. 1 are identified by like numeral and will not need any detailed explanation. The PLL circuit 2 in FIG. 4 includes two loop filters (23a and 23b); filter 23a has a higher f$_c$ (cutoff frequency) than filter 23b. A mode selection switch 25 enables connection of either of the two; in external synchronization mode, the switch 25 is set to select the output of the filter 23a. The other filter 23b has the same characteristics as those of LPF 23 shown in FIG. 1. Accordingly, in internal synchronization mode, switch 25 selects the lower-f$_c$ LPF 23b and the system operates in the same manner as does the apparatus in FIG. 1.

In external synchronization mode, LPF 23a is selected and PLL 2 responds to a higher frequency component in the phase variation of the color burst for the reproduced video signal. As shown in FIG. 5, the gain component of the input/output transfer function (G′(s)/(1+G′(s))) of variable delay line 1 is 0 dB up to a higher frequency, and as a result, any phase lag resulting from the proportional control is eliminated from the operating frequency range of the color loop. Consequently, the color loop can be driven stably with an increased gain.

Figure 6:
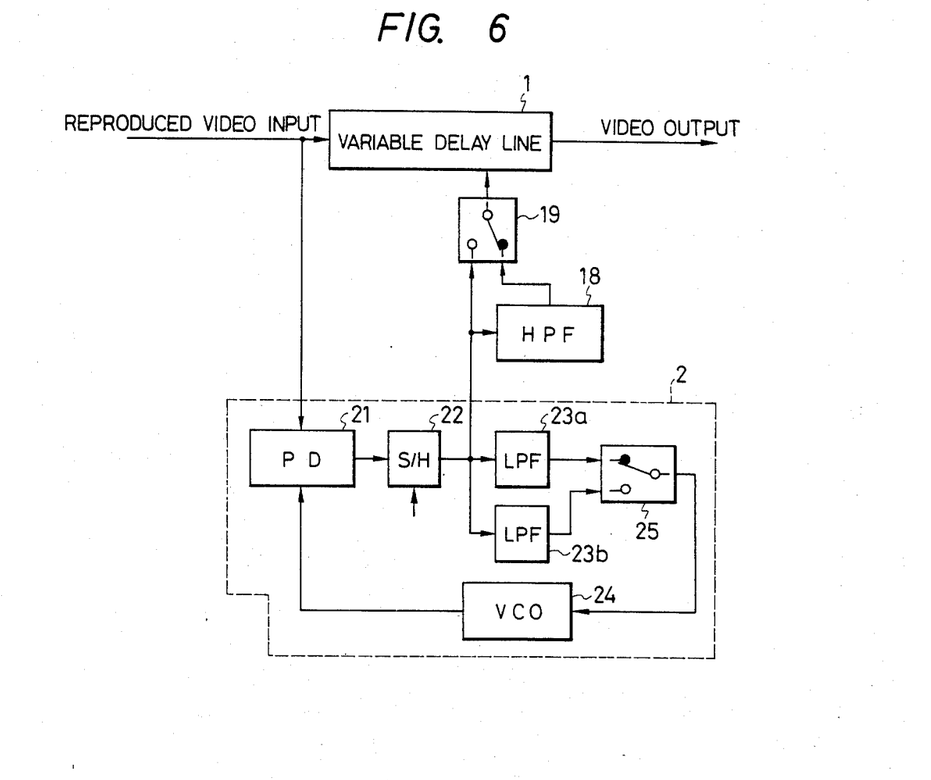
FIG. 6 is a block diagram showing part of the synchronizing apparatus in accordance with another embodiment of the present invention.

FIG. 6 is a block diagram showing part of another preferred embodiment of the present invention; the components common to FIG. 2 are identified by like numerals. The two LPFs in PLL 2 in accordance with the second embodiment have essentially the same frequency characteristics. Two delay line control signals (phase error signals from PLL 2), one having been passed through a HPF (high-pass filter) 18 and the other direct from the PLL 2, are selectively supplied to the variable line 1 through a switch 19.

In the external synchronization mode, switch 19 selects the phase error signal from HPF 18 as a delay line control signal. Obviously, this provides the same advantages as those obtained in the system shown in FIG. 4.

As in apparent from the foregoing description, the present invention enables the color loop to be driven in the external synchronization mode with a stably high gain, resulting in a smaller stationary phase error in the reproduced video signal. As a further advantage, the output of the variable delay line can be fed to one input of a phase detector in the color loop and so the desired color synchronization is ensured irrespective of variations in the amount of absolute delay in the proportional control loop.

PAL is one type of modulated color video signal as to which external synchronization may be effected according to the invention as described above. In this instance, the reproduced video input signal in FIGS. 4–6 is a PAL color video signal, whose chrominance component has its phase inversion condition precisely held, as will be described below.

Figure 7:
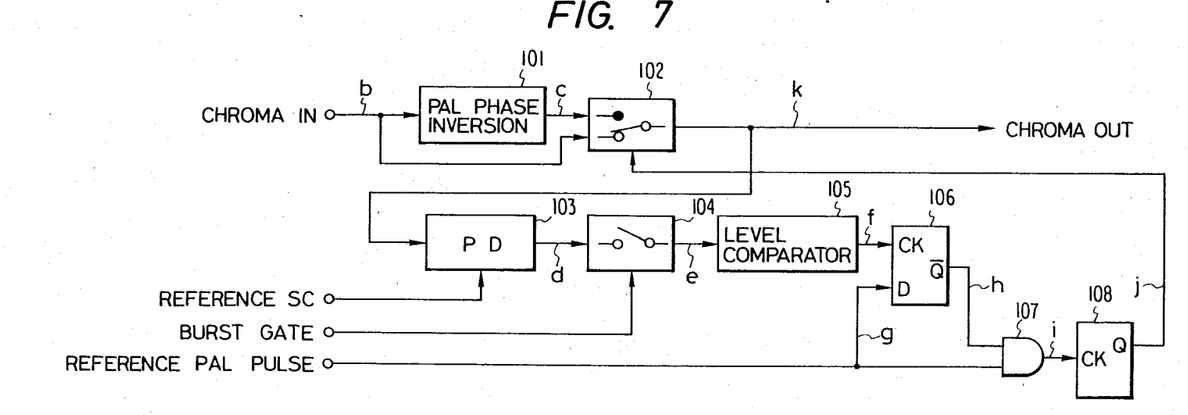
FIG. 7 is a block diagram drawing showing a PAL phase processing device in accordance with the third object of the invention.

Referring to FIG. 7 which shows the block diagram of one embodiment of a PAL phase processing device in accordance with the third object of the present invention, a reproduced PAL system chrominance input signal (CHROMA IN) b is subjected to PAL phase inversion by a phase inverter 101 so as to become one input c for a switch 102. The reproduced chrominance signal b is also directly applied as the other input of the switch 102. The output k of the switch 102 is delivered as a corrected chrominance signal (CHROMA OUT), and is compared in phase with a reference subcarrier kk by a PD (phase comparator) 103. This compared signal output d is extracted by a switch 104 only during burst periods according to the signal on burst gate line a as a comparing input e for a level comparator 105. The output f of the level comparator 105 is delivered as a clock input for a D-FF (delay flip-flop) 106 by which a reference PAL pulse g as a data input for the D-FF 106 is latched. This reference PAL pulse g is the one which indicates the normal PAL phase inversion condition of the chrominance signal, that is, it is a bi-level signal having one horizontal period. The $\overline{Q}$ output h of this D-FF 106 and the PAL pulse g are delivered to an AND gate 107 whose output i is delivered as a clock input for an FF 108. The Q output j of this FF 8 controls the switch 102.

Figure 8:
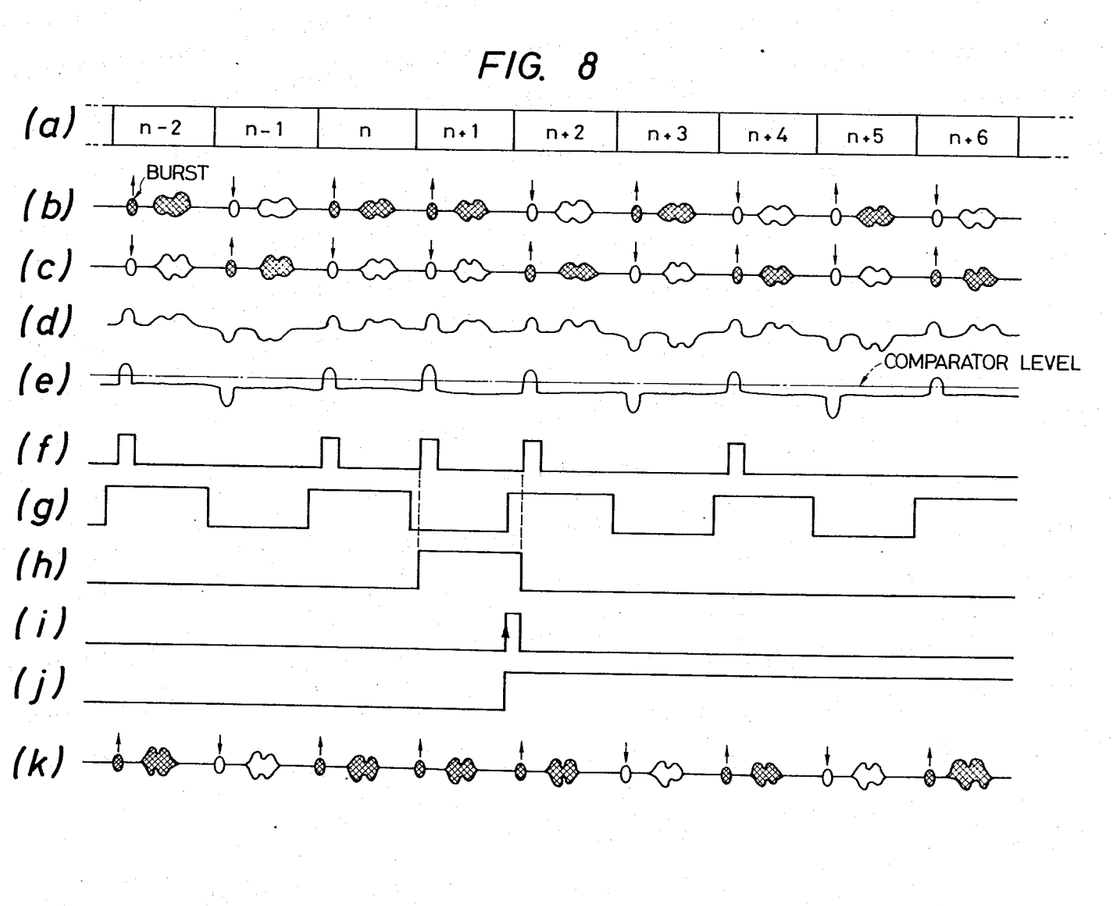
FIG. 8, consisting of (a)–(k), is a timing chart of the device shown in FIG. 7.

FIG. 8 shows a timing chart indicating the operation of the blocks in FIG. 7. FIG. 8(a) shows the horizontal scanning lines and their corresponding numbers. FIGS. 8(b) to (k) illustrate the corresponding waveforms of the signals (b) to (k) in each of the sections shown in FIG. 7.

Referring to FIGS. 8(a) and (b), the case in which the PAL phase inversion condition of the input chrominance signal is reversed at line (n+1) will be described. It is estimated that the input chrominance signal initially coincides with the reference PAL pulse, and the PAL phase is reversed at line (n+1). Up to line n, the Q output j of FF 108 is at low level and therefore, the switch 102 is turned to a contact side indicated by a white dot as shown in FIG. 7. Therefore, the operation up to line n is such that the chominance signal having $+(R-Y)$ phase (shown by oblique lines in FIG. 8) at line $(n-2)$, $-(R-Y)$ phase at line $(n-1)$, and $+(R-Y)$ phase at line n is delivered to the PD 103, and is compared with the reference subcarrier so as to obtain the output signal indicated by FIG. 8(d). The output signal is extracted during only burst periods by the switch 104, and a pulse f which is at a high level only during burst periods in line $(n-2)$ and n appears at the output of the comparator 105, the reference PAL pulse q which is latched at the rising edge of this signal f being the $\overline{Q}$ output h of the D-FF 106. Since the output Q of the FF 106 is at low level at all of lines $(n-2)$, $(n-1)$, and n, the output of the AND gate 107 is at a low level irrespective of the level of the reference PAL pulse. That is, the FF 108 is not triggered at all, and therefore, the output j of the FF 8 is maintained at a low level. That is, in this case, the switch is held as shown in FIG. 7.

When the PAL phase condition of the input chrominance signal is reversed at line (n+1), for example, as by scanning, the PAL phase of the input chrominance signal becomes $+(R-Y)$, $+(R-Y)$, $-(R-Y)$ and $+(R-Y)$ at lines n, (n+1), (n+2), and (n+3), respectively, and therefore, the order is disturbed. This is since, the phase is $+(R-Y)$ at line (n+1), the output f of the comparator 105 delivers a pulse which has a high level during the burst period, so that the reference PAL pulse g is latched. At this time, since the reference PAL pulse becomes low, the $\overline{Q}$ output h of the D-FF 106 becomes high. Accordingly, one of the inputs h of the AND gate 107 becomes high, so that the reference PAL pulse g is delivered directly as a trigger input to the FF 108, as shown in FIG. 8(i).

Due to the rise of this trigger the FF 108 is reversed, and therefore the Q output goes from a low level to a high level. The switch 102 then is set to select the output of the phase inverter 101 on a black dot contact side (FIG. 8(k)).

Accordingly, starting with line (n+1) a corrected chrominance signal having a PAL phase which coincides with the reference PAL pulse can be obtained. That is, the correction is made just after the inconsistency at line (n+1) is detected. This corrective action is continued until the PAL phases coincide with each other (i.e. the Q output of the D-FF 106 becomes low), and therefore, the correction continues to be made even if it is erroneously judged due to noise or the like, so that the correction of the PAL chrominance phase is rapid and accurate.

Figure 9:
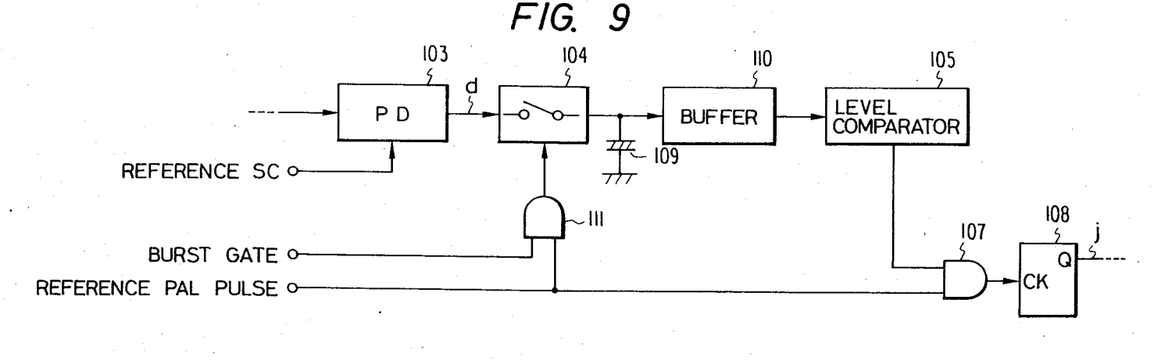
FIG. 9 is a block diagram showing in part another embodiment of a PAL phase processing device.

FIG. 9 is a block diagram which shows in part another embodiment of a PAL phase processing device, in which like reference numerals are used to indicate like blocks as shown in FIG. 7, the other blocks which are not shown in this Figure being identical with those shown in FIG. 7. In this embodiment, the output of the PD 103 is sampled in a sample hold circuit composed of the switch 104, a capacitor 109 and a buffer 110, and this sampling pulse is the gate output of an AND gate 111 which receives, as inputs, the reference burst gate signal a and the reference PAL pulse g. Further, the output of the comparator 105 is directly delivered as one input to the two-input AND gate 107.

Even with the above-mentioned arrangement, a signal which is identical with the signal shown in FIG. 8(j) is obtained at the outer j of the FF 108.

As mentioned above, since the chrominance correction signal of a PAL system is always monitored so that its PAL phase is discriminated, the correction is promptly made even if the PAL phase inversion condition is reversed. Further, even if it is erroneously judged due to noise, since the correcting operation is continued until the PAL phases coincide with each other, accurate PAL phase correction can be ensured.

What is claimed is:

1. An apparatus for the color synchronization of reproduced video signals, said apparatus being capable of being placed in either an external or internal synchronization mode, said apparatus comprising:
   control means for detecting a difference in phase between the output of an oscillation means and a reproduced color video signal in accordance with said detected phase difference, said control means comprising:
      filter means whose frequency characteristic can be selected to a first frequency characteristic or a second frequency characteristic, said filter means being selected in first frequency characteristic for use in controlling said time base while said apparatus is in an external synchronization mode, said filter means being selected in second frequency characteristic for use in controlling said time base while said apparatus is in an internal synchronization mode; and
      characteristic selection means for selecting said filter means into first or second frequency characteristic while said apparatus is in an external or internal synchronization mode respectively.

2. An apparatus according to claim 1, wherein said control means is a phase-locked loop circuit and said filter means is an internal loop filter.

3. An apparatus according to claim 1, wherein said reproduced color video signal is a PAL video signal.

4. An apparatus according to claim 3, further comprising PAL phase processing means for achieving external synchronization of said PAL video signal.

5. An apparatus according to claim 4, said PAL phase processing further comprising means for holding substantially precisely the phase inversion condition of said PAL video signal.

6. An apparatus according to claim 5, said means for holding substantially precisely the phase inversion condition of said PAL video signal comprising:
   PAL phase inversion means for altering the phase of the chrominance component of a PAL system color video signal so that it is made symmetrical with respect to the (B−Y) axis;
   selection means for selectively outputting the output signal of said PAL phase inversion means and the chrominance component of said input signal;
   phase detecting means for detecting the color burst phase of the selected output of said selection means; and control means for comparing a signal indicating the normal PAL phase inversion condition of said chrominance component at each horizontal scanning period with the detection signal of said phase detecting means so as to change over the selecting condition of said selection means when said indicating signal and said detection signal are different.

7. An apparatus for the color synchronization of reproduced video signals, said apparatus being capable of being placed in either an external or internal synchronization mode, said apparatus comprising:
   phase-locked loop means for detecting a difference in phase between the output of an oscillation means and a reproduced color video signal, and controlling the time base of said reproduced color video signal in accordance with said detected phase difference, said phase locked loop means comprising:
   first loop filter means for use in controlling said time base while said apparatus is in an external synchronization mode;
   second loop filter means for use in controlling said time base while said apparatus is in an internal synchronization mode; and
   filter selection means for selecting said first or second loop filter means while said apparatus is in an external or internal synchronization mode respectively.

* * * * *